May 9, 1967  A. JUBB ET AL  3,318,090
FUEL FLOW CONTROL UNIT FOR GAS TURBINE ENGINES
Filed Nov. 30, 1964  2 Sheets-Sheet 1
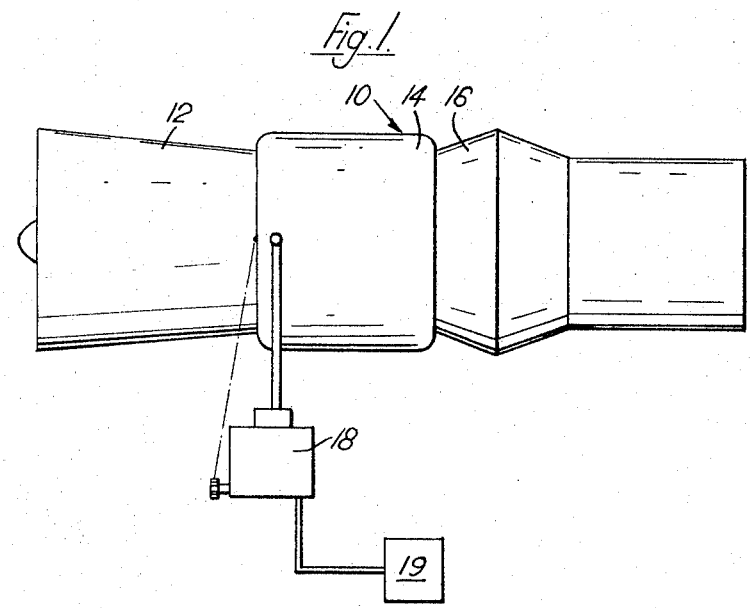
Inventors
ALBERT JUBB
KEITH ANTHONY HATCHETT
By Cushman, Darby & Cushman
Attorneys

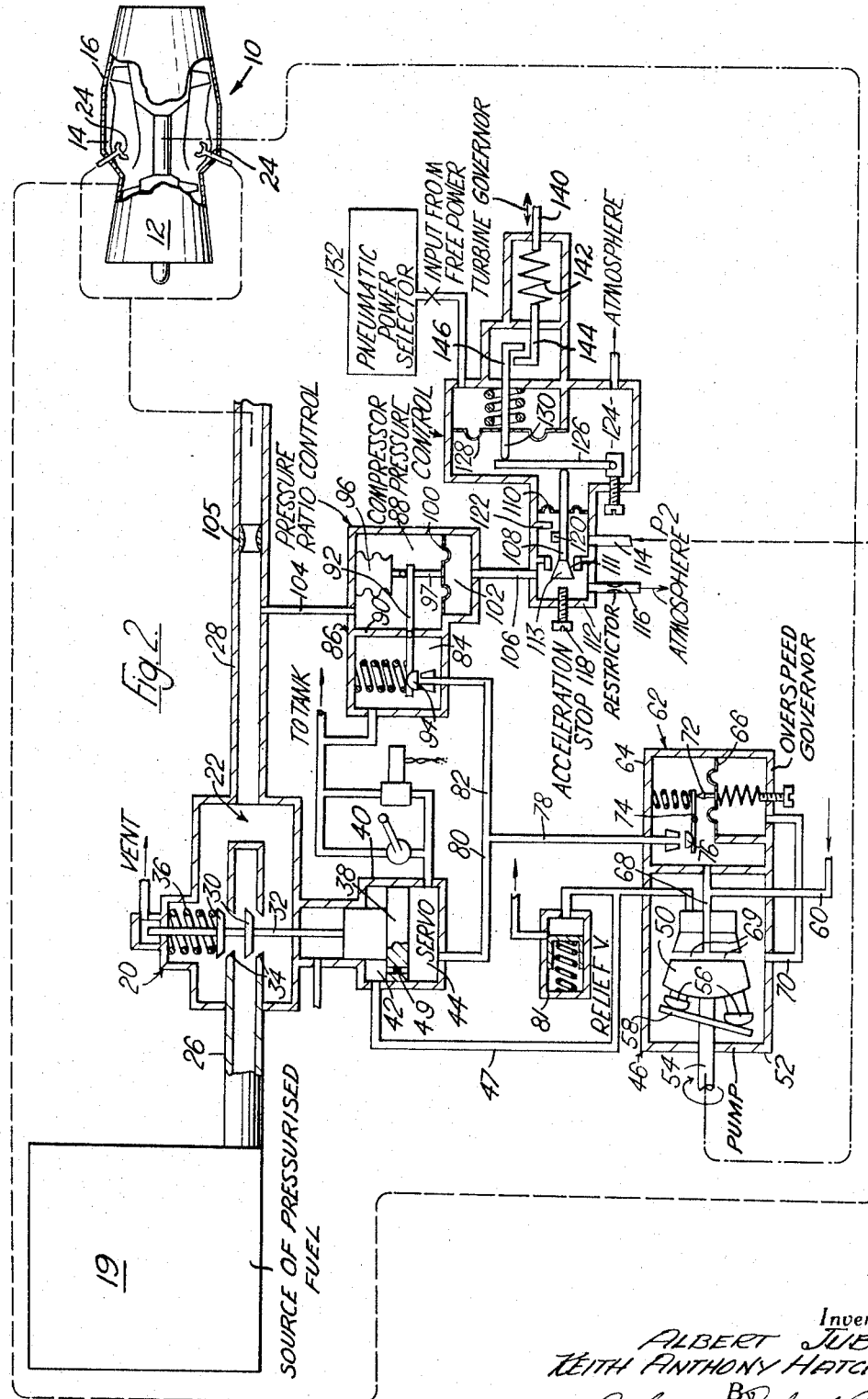

United States Patent Office 3,318,090
Patented May 9, 1967

3,318,090
FUEL FLOW CONTROL UNIT FOR GAS TURBINE ENGINES
Albert Jubb and Keith Anthony Hatchett, Derby, England, assignors to Rolls-Royce Limited, Derby, England
Filed Nov. 30, 1964, Ser. No. 414,562
Claims priority, application Great Britain, Dec. 2, 1963, 47,568/63
5 Claims. (Cl. 60—39.28)

This invention relates to a fuel flow control unit for use with a gas turbine engine of the type having compressor means, combustion equipment and turbine means arranged in flow series, the turbine means being drivingly connected to the compressor means.

It is an object of this invention to provide a simple and reliable fuel flow control unit for use with a gas turbine engine of the above type, and particularly for use with a gas turbine engine forming part of an electrical power generation installation and using a fuel, for example, natural gas.

According to the present invention a fuel flow control unit for use with a gas turbine engine of the above type comprises a fuel supply conduit connecting the source of pressurized fuel with the combustion equipment, valve means mounted in the fuel supply conduit to control the flow of fuel therethrough, first control means adapted to vary the degree of opening of the valve means in dependence upon the ratio between a selected proportion of the delivery pressure of the compressor means and the pressure of the fuel downstream of the valve means and second control means adapted to select that proportion of the delivery pressure of the compressor means upon which the operation of the first control means depends, thereby varying the power output of the gas turbine engine.

Preferably the first control means comprises a piston having opposite pressure faces of different area, a pump connected to supply hydraulic fluid directly to the piston face of smaller area and connected to supply hydraulic fluid at a pressure functionally related to, but less than, pump delivery pressure to the piston face of larger area, and pressure responsive means adapted to vary the pressure of the hydraulic fluid in contact with the piston face of larger area in response to changes in the ratio between the selected proportion of the delivery pressure of the compressor means and the pressure of the fuel downstream of the valve means.

The pressure responsive means may vary the rate at which hydraulic fluid is bled from the piston face of larger area, thereby varying the pressure of the hydraulic fluid in contact with said face.

The second control means preferably comprises a variable area restriction interposed between the pressure responsive means and the delivery of the compressor means, and the variable area restriction may comprise a fixed orifice and a movable obturator which is adapted to move in response to variations in compressor delivery pressure and adapted to be moved independently in response to variations in a control pressure.

In a preferred embodiment movable bellows, a pneumatic power selector adapted to provide said control pressure to the bellows and a linkage to transmit the motion of the bellows to the movable obturator are provided, whereby variations in the control pressure vary the power output of the gas turbine engine.

In order that the invention can be clearly understood and readily carried into effect a fuel flow control unit in accordance with the invention will now be particularly described, by way of example only with reference to the accompanying drawings, in which FIGURE 1 is a diagrammatic view of the fuel control unit and a gas turbine engine, and
FIGURE 2 shows the control unit in greater detail.

Referring to FIGURE 1 of the drawings 10 indicates a gas turbine engine having compressor means 12, combustion means 14 and turbine means 16, the turbine means being drivingly connected to the compressor means.

A fuel flow control unit 18 is provided to control the flow of gaseous fuel from a source of pressurized fuel 19 to the engine 10 so as to vary the output thereof.

Referring to FIGURE 2 of the drawings the fuel flow control unit 18 includes a fuel flow control valve 20 interposed in a fuel supply pipe 22 between the source of fuel 19, and the engine fuel injectors 24. The pipe 22 is formed in two portions 26 and 28, the portion 26 being connected between the source of fuel 19 and the interior of the valve 20, the valve having two valve members 30 mounted on a common spindle 32 which co-operate with two valve seats 34 formed in the portion 26. The valve members 30 are urged in a direction to prevent fuel flow from the portion 26 to the portion 28 by a spring 36, whilst they can also be urged in a valve closing or opening direction by a piston 38 disposed in a cylinder 40.

The piston 38 divides the cylinder 40 into two chambers 42 and 44 and is adapted so that the face thereof which forms one wall of the chamber 42 is of less area than the face which forms one wall of the chamber 44.

Hydraulic fluid, for example oil is fed into the chamber 42 by a pump 46 via a pipe 47 and is then fed into the chamber 44 through a restrictor 49 in the piston 38. It will be seen that the pressure within the chamber 42 will urge the valve members 30 in a valve closing direction and will be assisted in this by the spring 36.

The pump 46 is a plunger type pump of fixed displacement and comprises a centre body 50 rotatably supported within a housing 52. A shaft 54 connected to the centre body 50 is adapted to be driven by the engine 10.

A number of plungers 56 are carried in the centre body 50 and are mounted so as to be axially slideable in bores in the body, the outer ends of the plungers 56 engaging with a swash plate 58 disposed at an angle to the rotational axis of the centre body 50. Thus when the centre body is rotated the plungers 56 which are spring urged towards the swash plate draw hydraulic fluid into the bore, through a pipe 60, as they pass towards the portion of the swash plate which is the maximum distance away from the body, and as the plungers pass towards the portion of the swash plate which is closer to the body the plungers are pushed into their bores and the fluid passed into the pipe 47 and thus to the chamber 42. A pressure relief valve 81 is incorporated in the pipe 47 between the pump 46 and the chamber 42.

The pump 46 is provided with a top speed governor 62 which is adapted to reduce the fuel flow to the engine when a predetermined rotational engine speed is attained. The governor 62 is housed in an extension 64 of the housing 52 and includes a diaphragm 66 which on one side is subjected to the pressure of the hydraulic fluid prior to its entry to the pump 46 which pressure is transmitted via a conduit 68, whilst the other side of the diaphragm is subjected to hydraulic fluid from the housing 52 which has been pressurized centrifugally by rotation of the centre body 50 and which passes from the part of the conduit 68 within the centre body to the housing 52 through drillings 69.

A conduit 70 conducts the pressurized hydraulic fluid from the housing 52 to the diaphragm 66.

A centre body 72 is supported on the diaphragm 66, and is disposed so as to engage with one end of a pivoted beam 74, the other end of the beam supporting a half ball valve 76. The half ball valve 76 is disposed over the end of a pipe 78 whose other end is connected to a pipe 80 which communicates with the chamber 44.

As the engine rotational speed increases it will be appreciated that the pressure of the fluid applied to the diaphragm via the conduit 70 will also increase thus causing the diaphragm to move upwardly and pivot the beam 74 so as to move the half ball valve 76 away from the end of the pipe whereby fluid is bled off from the chamber 44 thus reducing the pressure therein whereby the piston 38 is moved in a valve closing direction to reduce the flow of fuel to the fuel injectors. The fuel flow control unit also includes means for controlling the flow of fuel in dependence upon the delivery pressure of the engine compressor and also means for selectively increasing and decreasing fuel flow independently of the control effected by the top speed governor and the ratio of the fuel pressure and compressor delivery pressure.

A further pipe 82 is connected at one end to the pipe 80 and at its other end with a one chamber 84 of a housing 86. A second chamber 88 is provided in the housing 86 and the two chambers are separated from each other by a wall 90, which pivotally supports a beam 92. A half-ball valve 94 is supported on that end of the beam which extends into the chamber 84, the half-ball valve being disposed over the end of the pipe 82 whereby movement of the half-ball valve 94 towards or away from the pipe 82 will decrease or increase the bleed off of fluid from the chamber 44.

A capsule 96 is mounted within the chamber 88 and connected thereto is one end of rod 97, whose other end is connected to a diaphragm 100 which is disposed across the lower portion of the chamber 88 to define a further chamber 102. As can be seen from FIGURE 2 of the drawings the beam 92 is connected to the rod 97.

A pipe 104 is connected between the chamber 88 and the portion 28 of the fuel supply line 22 upstream of a restriction 105, whilst the chamber 102 is subjected to a pressure which is functionally related to the delivery pressure of the engine compressor through a pipe 106.

It will thus be seen that the fuel flow to the engine fuel injectors will depend on the ratio of fuel pressure and compressor delivery pressure.

The function of the delivery pressure of the engine compressor is obtained by means of a variable restriction which comprises an axially elongated valve member 108 supported in a diaphragm 110 carried in a housing 112. The valve member 108 is provided with a head 113 on the left hand end thereof which progressively increases in diameter as it extends away from the diaphragm, and the head co-operates with an orifice 111 formed in the housing 112. An air inlet 114 which is connected to the delivery end of the engine compressor is provided in the housing 112 between the diaphragm 110 and the orifice 111, a second orifice is provided between the outlet from orifice 111 and atmosphere 116.

As can be seen in FIGURE 2 of the drawings the inlet to the pipe 106 is disposed between the orifice 111 and the second orifice whereby the pressure transmitted to the chamber 102 will be a function of engine compressor delivery pressure.

An adjustable stop 118 is provided in the housing 112 with which the head 113 of the valve member 108 can engage to limit the maximum area of the orifice 111 and so limit the maximum fraction of compressor pressure which can be applied to the chamber 102, whilst interengaging stops 120 and 122 are provided on the valve member 108 and housing 112 to limit the minimum fraction of compressor pressure in the chamber 102.

If under steady running conditions of the engine the delivery pressure of the engine compressor increases, the pressure drop across the variable restriction will increase causing a pressure drop in the chamber 102 whereby the diaphragm 100 will move downwardly to pivot the beam 92 and move the half ball valve away from the end of the pipe 82 and increase the bleed off of fluid from the chamber 84 whereby the pressure in the chamber 44 is decreased and the piston 38 moved in a valve closing direction.

If the delivery pressure of the engine compressor should decrease the pressure drop across the variable restriction will decrease then the diaphragm will move upwardly and the half ball valve 94 will be moved towards the end of the pipe 92 to decrease the bleed off of fuel from the chamber 44 with the result that the piston 38 moves in a valve opening direction.

When the head 113 is moved into engagement with the stop 118 the pressure in the chamber 102 is increased whereby the diaphragm 100 is moved upwardly to increase fuel flow in the manner previously described, whilst when the stops 120, 122 engage the said pressure is reduced causing a reduction in fuel flow.

To enable the fuel flow to the engine, and therefore the power output of the engine, to be controlled below the limit set by the top speed governor 62 and independently of the control effected by the ratio of the fuel pressure and compressor delivery pressure, the valve member 108 is extended so as to project beyond the right hand side of the diaphragm 110 into a chamber 124 open to atmosphere, where it can be engaged by a pivotally mounted arm 126. Pivotal movements of the arm 126 are effected by a diaphragm 128 carrying a rod 130, the side of the diaphragm in the chamber 124 being subjected to atmospheric pressure whilst its other face can be subjected to various selected pressures from a pneumatic power selector 132.

When it is desired to increase the fuel flow to the engine the pressure on the diaphragm 128 is increased whereby it is caused to move to the left of the drawing whereby the arm is turned about its pivot to increase the size of the orifice 111. As has been stated previously this will cause the half ball valve to move towards the pipe 92 and reduce the bleed off of fluid from the chamber 44 whereby the pressure thereon will increase and cause the piston 38 to move in a valve open direction thus increasing the fuel flow to the engine.

Thus, the pneumatic power selector 132 is used to select the power output at which the engine is to run by varying the proportion of the compressor delivery pressure fed to the chamber 102 of the pressure ratio control, while the pressure ratio control ensures that this power output is maintained.

A plurality of gas turbine engines provided with fuel flow control units as above described can be arranged so as to discharge their gas efflux into a common manifold or plenum chamber, the chamber being provided with one or more outlets through which gas can be selectively discharged to drive a turbine associated with the selected outlets.

Where a plurality of engines are employed there will be a common pneumatic power selector 132 so that the fuel flow to all the engines can be varied simultaneously.

Where the fuel system is used as above described a further governor may be provided to control the speed of the turbines at the outlets from the plenum chamber. This further governor comprises a speed responsive device, not shown, connected so as to be rotated by the turbine whereby should the turbine speed increase beyond the desired value the diaphragm 128 will be moved to the right of the drawing by a linkage comprising a rod 140, a spring 142 and engaging members 144 and 146 thus moving the rod 130 out of engagement with the valve 108 and permitting the compressor delivery pressure to move the diaphragm 110 to the right and reduce the size of the orifice 111. As previously described a reduction in the size of the orifice 111 reduces the pressure in the chamber 102 which as previously described causes the piston 38 to move in a valve closing direction.

What we claim is:

1. A fuel flow control unit for use with a gas turbine engine of the type having compressor means, combustion equipment and turbine means arranged in flow series, the turbine means being drivingly connected to the compressor means, together with a source of pressurized fuel, the fuel flow control unit comprising a fuel supply conduit connecting the source of pressurized fuel with the combustion equipment, valve means mounted in the fuel supply conduit to control the flow of fuel therethrough, first control means for varying the degree of opening of the valve means in dependence upon the ratio between a selected proportion of the delivery pressure of the compressor means and the pressure of the fuel downstream of the valve means, said first control means comprising a piston having opposite pressure faces of different areas, a pump connected to supply hydraulic fluid directly to the piston face of smaller area and connected to supply hydraulic fluid at a pressure functionally related to, but less than, pump delivery pressure to the piston face of larger area, and pressure responsive means for varying the pressure of the hydraulic fluid in contact with the piston face of larger area in response to changes in the ratio between the selected proportion of the delivery pressure of the compressor means and the pressure of the fuel downstream of the valve means, and second control means for selecting that proportion of the delivery pressure of the compressor means upon which the operation of the first control means depends, thereby varying the power output of the gas turbine engine.

2. A fuel flow control unit as claimed in claim 1 and in which the pressure responsive means functions to vary the rate at which hydraulic fluid is bled from the piston face of larger area, thereby varying the pressure of the hydraulic fluid in contact with said face.

3. A fuel flow control unit as claimed in claim 1 and in which the second control means comprises a variable area restriction interposed between the pressure responsive means and the delivery of the compressor means.

4. A fuel flow control unit as claimed in claim 3 and in which the variable area restriction comprises a fixed orifice and a movable obturator which is moved in response to variations in compressor delivery pressure and independently in response to variations in a control pressure.

5. A fuel flow control unit as claimed in claim 4, comprising movable bellows, a pneumatic power selector for providing said control pressure to the bellows and a linkage to transmit the motion of the bellows to the movable obturator, whereby variations in the control pressure vary the power output of the gas turbine engine.

References Cited by the Examiner
UNITED STATES PATENTS

| | | | |
|---|---|---|---|
| 2,714,803 | 8/1955 | Abild | 60—39.28 |
| 2,869,322 | 1/1959 | Rankin | 60—39.28 |
| 2,968,283 | 1/1961 | Hilker et al. | 60—39.28 X |
| 3,142,259 | 7/1964 | Tyler | 60—39.28 X |

JULIUS E. WEST, *Primary Examiner.*